United States Patent
Swingley

(10) Patent No.: US 6,290,267 B1
(45) Date of Patent: Sep. 18, 2001

(54) CAM-LOCK FITTING

(75) Inventor: Douglas R. Swingley, Saugus, CA (US)

(73) Assignee: Spears Manufacturing Company, Sylmar, CA (US)

( * ) Notice: Subject to any disclaimer, the term of this patent is extended or adjusted under 35 U.S.C. 154(b) by 0 days.

(21) Appl. No.: 09/468,421

(22) Filed: Dec. 20, 1999

(51) Int. Cl.$^7$ ........................................ F16L 37/18
(52) U.S. Cl. ................... 285/312; 285/320; 137/614.06
(58) Field of Search ......................... 285/312; 137/614, 137/614.06; 251/149, 149.09; 205/305, 320

(56) References Cited

U.S. PATENT DOCUMENTS 2,108,040 * 2/1938 Bluehdorn et al. ............... 285/88
3,860,274 * 1/1975 Ledstrom et al. ............... 285/312
5,595,217 * 1/1997 Gillen et al. ............... 137/614.06

\* cited by examiner

*Primary Examiner*—Lynne H. Browne
*Assistant Examiner*—Carlos Lugo
(74) *Attorney, Agent, or Firm*—Sheldon & Mak; Denton L. Anderson

(57) ABSTRACT

The invention is an improved cam-lock fitting having grooves in the outer surface of the fitting for accepting cams of a mating fitting. The grooves are provided without forming indentations or obstructions in the interior flow through passage of the fitting. The cam-lock fitting includes a body with an interior flow path having a first opening and a second opening. The second opening is provided by a boss having a distal end with a transverse cross-section that is circular about the external surface and a transverse cross-section that is elliptical about the internal surface.

10 Claims, 3 Drawing Sheets

CAM-LOCK FITTING

FIELD OF THE INVENTION

This invention relates generally to fittings, valves, and connectors, and more specifically to cam-lock fittings.

BACKGROUND OF THE INVENTION

Cam-lock type fittings for valves and connectors are known in the art. These devices generally function by having a pair of cams which rotate upon a fixed axis from opposite sides of a male fitting such that, upon rotation from an unlocked position to a locked position, the distended portion of each cam extends through openings in the sidewall of the male fitting. When the male fitting is abutted over a female fitting, the rotation of the cams to the locked position causes the distended portion of the cams to wedge against grooves in the side wall of the female fitting to reversibly lock together the two fittings.

The walls of cam-lock fittings are required by industry operating and safety standards to be of a minimum thickness. Additionally, the outer surface of the fitting is necessarily circular and the outer diameter measurement is fixed in dimension by industry standards. Prior art cam-lock fittings have a conventional circular interior. To assure that the wall thickness at the grooves is of minimum thickness, the non-groove portion of the wall must be thicker than that of a comparable fitting which is not a cam-lock type. It necessarily follows, therefore, that the interior diameter of prior art cam-lock fittings must be smaller than the interior diameter of a comparable fitting which is not a cam-lock type.

Since prior art cam-lock type fittings have a relatively small diameter, the cross-sectional area is relatively small at this point in the fitting. This sometimes creates a problem because the smaller cross-sectional area results in a lower fluid flow capacity through this part of the fitting. A bottleneck such as this reduces the fluid flow capacity of a valve and/or entire fluid line coupled to a prior art cam-lock fitting.

Another problem associated with existing cam-lock type fitting designs is that the groove indentation forms a small step along the interior surface at the transition from the part of the fitting where the groove is disposed to the part of the fitting having no groove. The step acts as an obstruction because the bottom and/or sides of the fitting are not even with the bottom and/or sides of the adjacent pipe surface. One particular problem with the step is that it tends to prevent complete drainage of the contents of a tank or fluid line when the drain line from the tank or fluid line is disposed along the same horizontal plane as the bottom of the tank or fluid line.

Accordingly, there is a need for cam-lock type fitting that improves on the existing designs by providing a maximum interior diameter within the flow-through passage of the fitting which substantially eliminates steps within the interior surface while maintaining the other cam-lock groove requirements.

SUMMARY

The invention satisfies this need. The invention is an improved cam-lock fitting in which the grooves for accepting cams of a mating fitting are provided without creating an interior indentation or step that reduces the interior diameter within the flow through passage.

The invention is a cam-lock fitting comprising a body having a flow path therethrough. The flow path comprises a first opening and a second opening. The second opening is provided by a boss having a proximal end, a distal end, an external surface, an internal surface and an interior cross-sectional width. The external surface of the proximal end of the boss has a pair of opposed grooves for accepting the cams of a cam-lock fitting. The grooves are disposed within a groove plane. The transverse cross-section of the external surface of the distal end of the boss is substantially circular. Conversely, the transverse cross-section of the internal surface of the distal end of the boss is non-circular whereby the interior cross-sectional width in the groove plane is less than the interior cross-sectional width in the plane perpendicular to the groove plane.

In a preferred embodiment, the cam-lock fitting comprises a cam-lock valve having an open/close mechanism disposed within the body for reversibly opening and closing the flow path.

DRAWINGS

These features, aspects and advantages of the present invention will become better understood with regard to the following description, appended claims and accompanying figures where:

DETAILED DESCRIPTION

Figure 1:
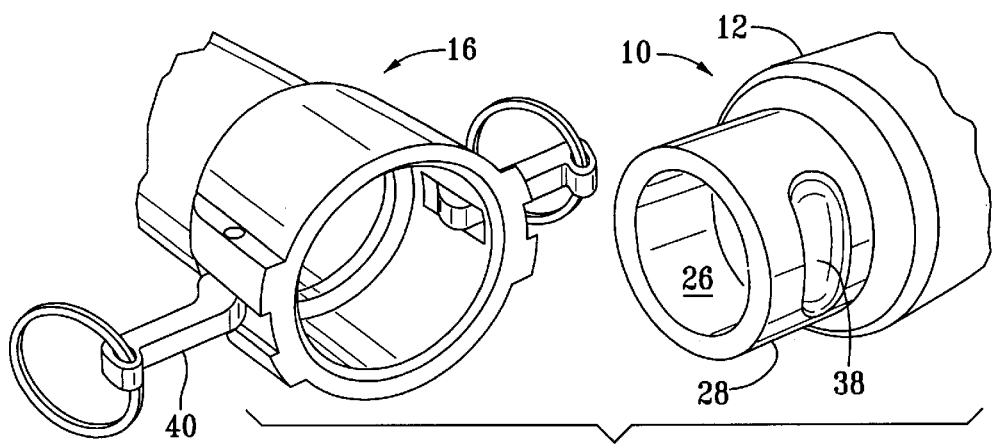
FIG. 1 is a perspective view of a disassembled cam-lock combination, including a cam-lock fitting having features of the invention.
Figure 2:
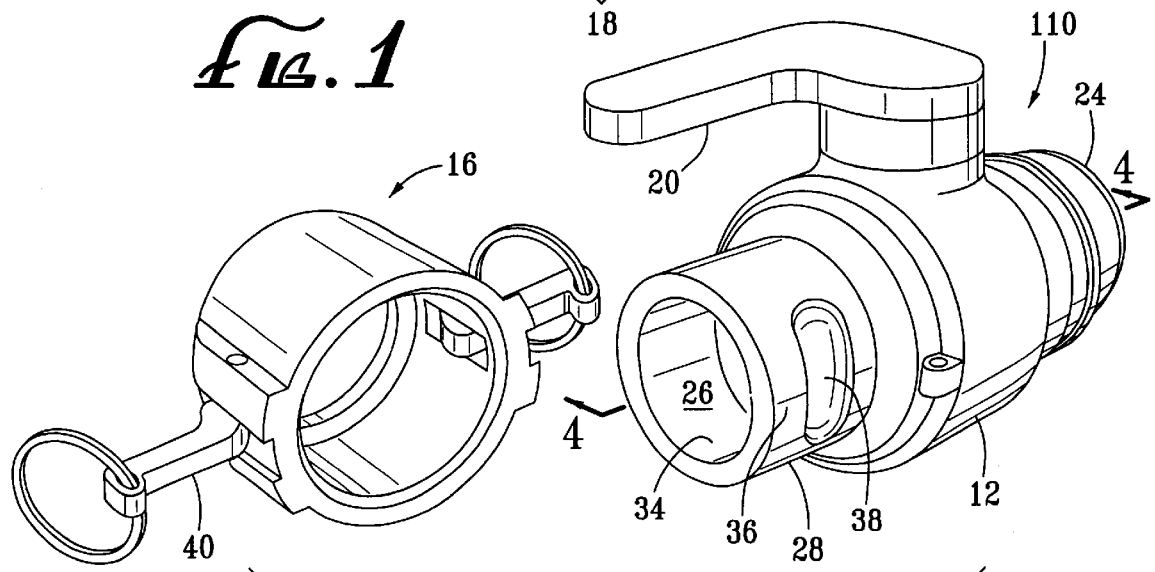
FIG. 2 is a perspective view of a disassembled cam-lock combination, including a cam-lock valve having features of the invention.
Figure 3:
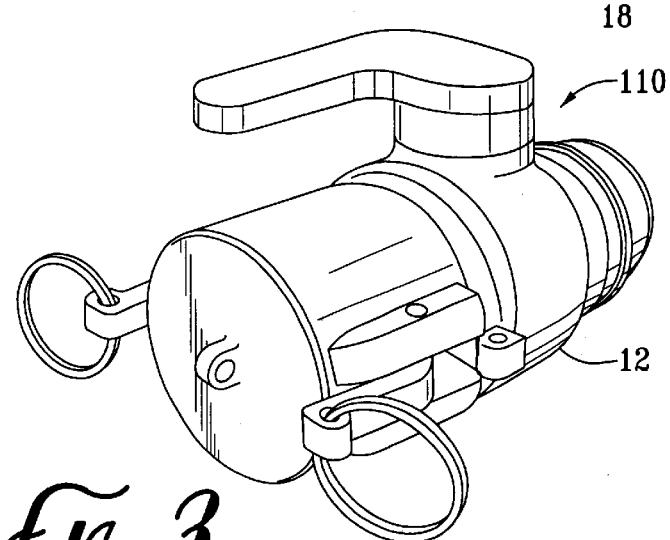
FIG. 3 is a perspective view of the cam-lock combination illustrated in FIG. 2, showing the combination fully assembled.
Figure 4:
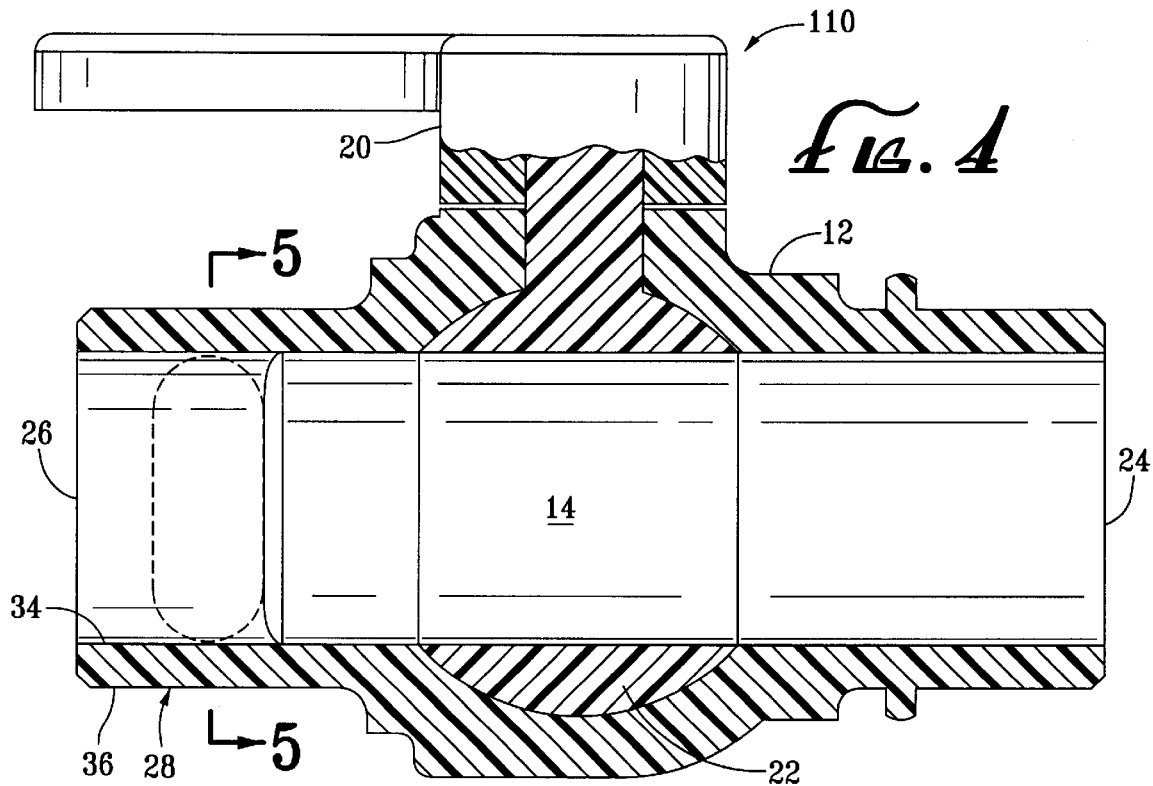
FIG. 4 is a cross-sectional view of a cam-lock valve having features of the invention.
Figure 5:
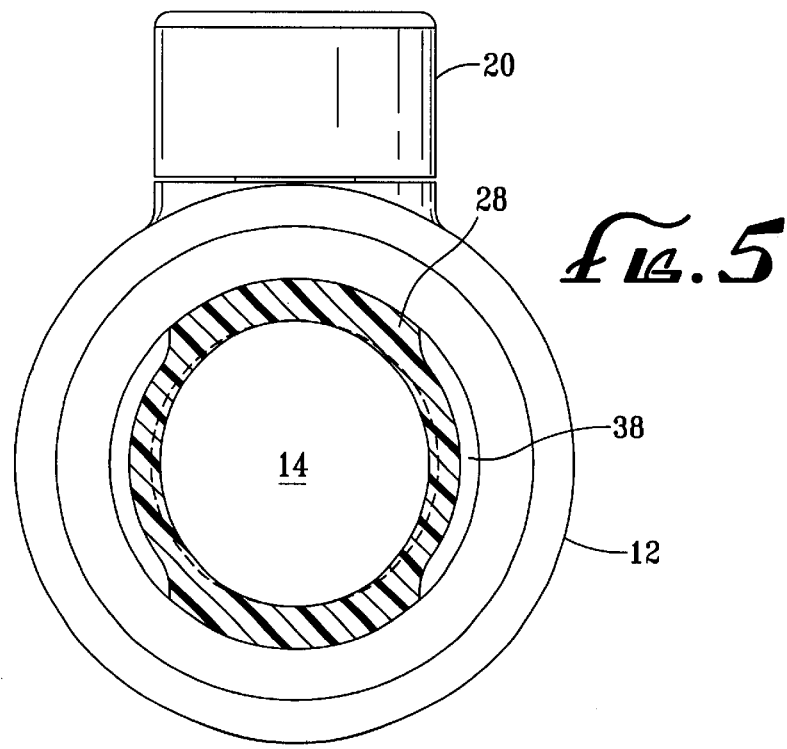
FIG. 5 is a cross-sectional view of the cam-lock valve illustrated in FIG. 4, taken along line 5—5.

The following discussion describes in detail one embodiment of the invention and several variations of that embodiment. This discussion should not be construed, however, as limiting the invention to those particular embodiments. Practitioners skilled in the art will recognize numerous other embodiments as well.

With reference to the embodiment of the invention illustrated in FIGS. 1–4, the invention is a cam-lock fitting 10 comprising a body 12 having a flow path 14 therethrough. The cam-lock fitting 10 is reversibly attached to a cam-lock connector 16, which typically embodies a cap, fitting, pipe, or similar such article, to form a cam-lock combination 18.

In the embodiment illustrated in FIGS. 2–5, the invention can further comprise an open/close 20 mechanism disposed within the body 12 for reversibly opening and closing a flow path 14 defined through the cam-lock fitting 10. In this embodiment, the cam-lock fitting 10 comprises a cam-lock valve 110. In a preferred embodiment, the open/close 20 mechanism comprises a ball 22 and the cam-lock valve 110 is a ball type valve.

Figure 6:
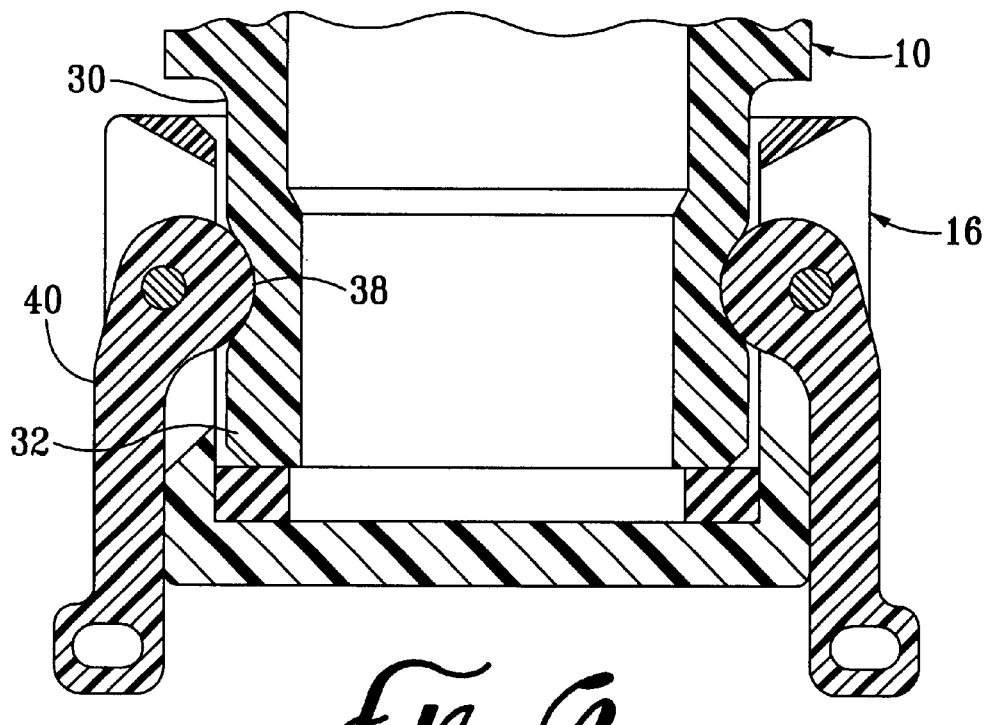
FIG. 6 is a cross-sectional view taken along the groove plane of a cam-lock combination including a fitting having features of the invention showing the cams engaged.
Figure 7:
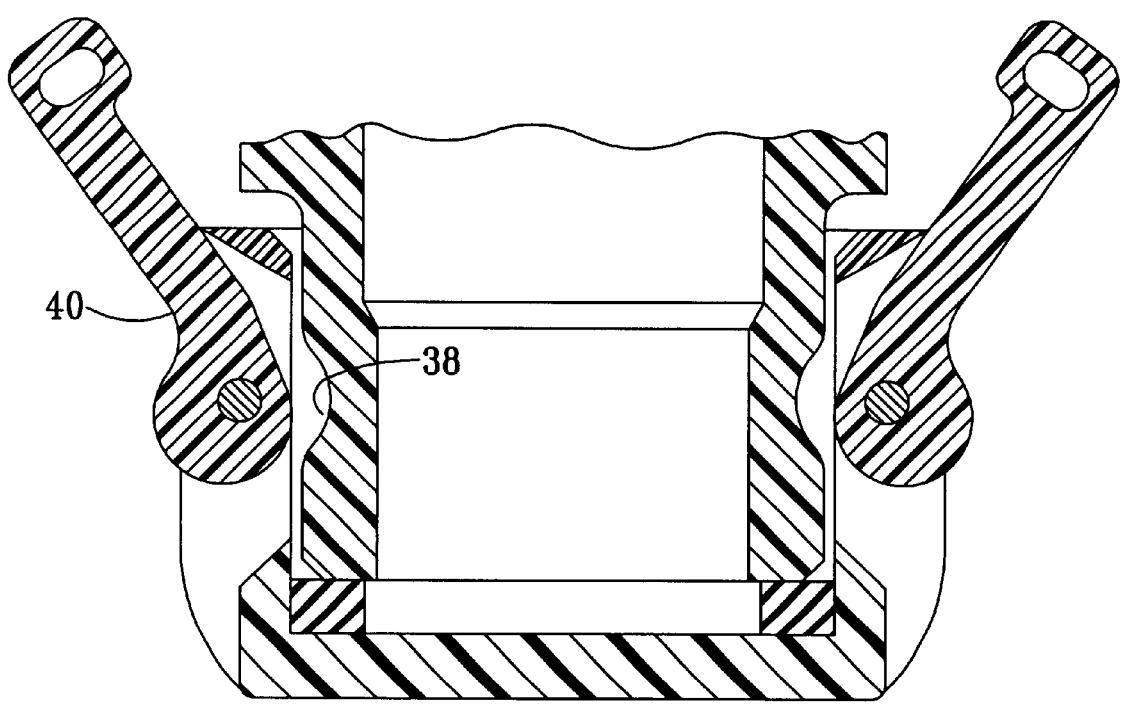
FIG. 7 is a cross-sectional view of the cam-lock combination shown in FIG. 6 showing the cams disengaged.

The flow path 14 comprises a first opening 24 and a second opening 26. The second opening 26 can be provided by a boss 28. The boss 28 comprises a proximal end 30 and a distal end 32. The distal end 32 of the boss 28 is disposed coincident with the terminus of the cam-lock fitting 10 at the second opening 26. As illustrated in FIGS. 6 and 7, the proximal end 30 of the boss 28 is disposed closer to the central portion of the body 12 along it's longitudinal axis.

The boss 28 further comprises an internal surface 34 and an external surface 36. As illustrated in FIGS. 1, 2, 6, and 7, the external surface 36 of the proximal end 30 of the boss 28 has a pair of opposed grooves 38 for accepting the cams 40 of the mating cam-lock connector 16 to form the cam-lock combination 18. Rotation of the cams 40 from a disengaged position to a locked position causes the distended portion of the cams to wedge against the grooves 38 to reversibly lock together the cam-lock fitting 10 and the cam-lock connector 16.

The grooves 38 are disposed within an imaginary groove plane that bisects the body 12 about the longitudinal axis of the body 12. Typically, the grooves 38 are shaped as furrows that form a radial indentation in a portion of the external surface 36 of the boss 28 along the circumference of the boss 28 in a common transverse cross-sectional plane. The size of the grooves 38 in the embodiment illustrated in the drawings are about ⅝ inch in width and about 2 inches in length. However, the grooves 38 may be sized and dimensioned differently in other embodiments. As illustrated in FIGS. 6 and 7, the grooves 38 are typically disposed symmetrically about the groove plane such that the middle of the grooves 38, with respect to their longitudinal axis, are about 180 degrees apart on the external surface 36 of the body 12.

It is also typical that the transverse cross-section of the external surface 36 of the distal end 32 of the boss 28 is substantially circular. The external cross-sectional diameter of the boss 28 can be various sizes ranging between about 1 inch up to more than several feet. In the embodiment illustrated in the drawings, the external cross-sectional diameter of the boss 28 is about 2½ inches.

In contrast to the circular external surface 36 of the distal end 32 of the boss 28, the transverse cross-section of the internal surface 34 of the distal end 32 of the boss 28 is non-circular. The measurement spanning the transverse cross-section of the internal surface 34 is described herein as the interior cross sectional width, which varies according to the cross-sectional measurement of the longitudinal plane in which the measurement is taken. In a preferred embodiment, the interior cross-sectional width in the groove plane is less than the interior cross-sectional width in the plane perpendicular to the groove plane. Typically, the interior cross-sectional width in the groove plane is between about 1/16 inch and about ½ inch less than the interior cross-sectional width in the plane perpendicular to the groove plane. However, this variance may differ according to the size of the cam-lock fitting 10. In the embodiment illustrated in the drawings, the interior cross-sectional width in the groove plane is about ⅛ inch less than the interior cross-sectional width in the plane perpendicular to the groove plane. As illustrated in the embodiment in FIG. 5, the transverse cross-section of the internal surface 34 of the distal end 32 of the boss 28 is substantially elliptical.

Preferably, the internal surface 34 of the boss 28 that is bordering the plane perpendicular to the groove plane is configured such that the interior radial surface of the boss 28 is in substantial alignment with the adjacent surface of the flow path 14. Further preferable, when the flow path 14 is disposed in the horizontal and the groove plane is also disposed in the horizontal, the lowermost portion of the internal surface 34 of the boss 28 is disposed in the same horizontal plane as the lowermost portion of the flow path 14.

Because the transverse cross-section of the internal surface 34 of the distal end 32 of the boss 28 is non-circular, the interior diameter within the flow path 14 of the fitting is maximized and steps and bottlenecks within the flow path 14 are eliminated. Consequently, the cam-lock fitting 10 provides superior results to conventional cam-lock fittings in a wide variety of applications. For example, in horizontal installations on the bottom of tanks the cam-lock fitting 10 of the invention allows the contents of the tank to be completely drained. The cam-lock fitting 10 of the invention also is superior to the conventional cam-lock fittings when used in piping systems that require the absence of stagnant flow areas, in piping systems where minimizing obstructions and restrictions is important, and in drainage systems which tend to be under a minimal pressure drop.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A cam-lock fitting comprising a body having a flow path therethrough, the flow path having a first opening and a second opening, wherein:
    (a) the second opening is provided by a boss having a proximal end, a distal end, an external surface, an internal surface and an interior cross-sectional width;
    (b) the external surface of the proximal end has a pair of opposed grooves for accepting the cams of a cam-lock fitting, the grooves being disposed within a groove plane;
    (c) the transverse cross-section of the external surface of the distal end of the boss is substantially circular; and
    (d) the transverse cross-section of the internal surface of the distal end of the boss is non-circular, the interior cross-sectional width in the groove plane being less than the interior cross-sectional width in the plane perpendicular to the groove plane.

2. The cam-lock fitting of claim 1 wherein the interior cross-sectional width in the groove plane is between about 1/16 inch and about ½ inch less than the interior cross-sectional width in the plane perpendicular to the groove plane.

3. The cam-lock fitting of claim 1 wherein the transverse cross-section of the internal surface of the distal end of the boss is substantially elliptical.

4. The cam-lock fitting of claim 1 further comprising a cam-lock connector that reversibly attaches to the cam-lock fitting at the second opening.

5. A cam-lock valve comprising (i) a body having a flow path therethrough, the flow path having a first opening and a second opening, and (ii) an open/close mechanism disposed within the body for reversibly opening and closing the flow path, wherein:
    (a) the second opening is provided by a boss having a proximal end, a distal end, an external surface, an internal surface and an interior cross-sectional width;
    (b) the external surface of the proximal end has a pair of opposed grooves for accepting the cams of a cam-lock fitting, the grooves being disposed within a groove plane;
    (c) the transverse cross-section of the external surface of the distal end of the boss is substantially circular; and (d) the transverse cross-section of the internal surface of the distal end of the boss is non-circular, the interior cross-sectional width in the groove plane being less than the interior cross-sectional width in the plane perpendicular to the groove plane.

6. The cam-lock valve of claim 5 wherein the interior cross-sectional width in the groove plane is between about ¹⁄₁₆ inch and about ½ inch less than the interior cross-sectional width in the plane perpendicular to the groove plane.

7. The cam-lock valve of claim 5 wherein, when the flow path is disposed in the horizontal and when the groove plane also disposed in the horizontal, the lowermost portion of the internal surface of the boss is disposed in the same horizontal plane as the lowermost portion of the flow path.

8. The cam-lock valve of claim 5 wherein the cam-lock valve is a ball valve.

9. The cam-lock valve of claim 5 wherein the transverse cross-section of the internal surface of the distal end of the boss is substantially elliptical.

10. The cam-lock valve of claim 5 further comprising a cam-lock connector that reversibly attaches to the cam-lock valve at the second opening.

* * * * *